United States Patent [19]
Kimura et al.

[11] Patent Number: 5,857,178
[45] Date of Patent: *Jan. 5, 1999

[54] NEURAL NETWORK APPARATUS AND LEARNING METHOD THEREOF

[75] Inventors: Tomohisa Kimura, Funabashi; Takeshi Shima, Sagamihara, both of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 872,929

[22] Filed: Jun. 11, 1997

Related U.S. Application Data

[63] Continuation of Ser. No. 309,884, Sep. 20, 1994, abandoned.

[30] Foreign Application Priority Data

Sep. 20, 1993 [JP] Japan ................................. 5-232652

[51] Int. Cl.$^6$ .................................................. G06F 15/18
[52] U.S. Cl. .............................................................. 706/41
[58] Field of Search .................................. 395/27, 21, 22, 395/23; 706/41

[56] References Cited

U.S. PATENT DOCUMENTS 5,165,009  11/1992  Watanabe et al. ...................... 706/41

OTHER PUBLICATIONS

Youngik Lee et al.; An Analysis of Premature Saturation in Back Propagation Learning; Neural Network, vol. 6., pp. 719–728, 1993.

Takeshi Shima, et al.; Neuro Chips with On–Chip Back–Propagation and/or Hebbian Learning; IEEE Journal of Solid–State Circuits, vol. 27, No. 12, pp. 1868–1876, Dec. 1992.

Jordan L. Holt, et al.; Finite Precision Error Analysis of Neural Network Electronic Hardware Implementations; Proceedings of International Joint Conference on Neural Networks, Seattle, 1, pp. 519–525, IEEE (1991).

Implementations; Proceding of International Joint Conference on Neural Networks, Seattle, 1, pp. 519–525, IEEE (1991).

Patrick A. Shoemaker, et al.; Back Propagation Learning with Trinary Quantization of Weight Updates; Neural Networks, vol. 4, pp. 231–241, 1991.

Christine Hubert, "Pattern Completion with the Random Neural Network using the RPROP Learning Algorithm", Systems, Man, and Cybernetics, 1993 Int. Conf., pp. 613–617, 1993.

G.E. Hinton and T.J. Sejnowski, "Learning and Relearning in Boltzmann Machines", in Parallel Distributed Processing, eds. David E. Rumelhart and James L. McClelland, pp. 282–317, 1986.

*Primary Examiner*—Allen R. MacDonald
*Assistant Examiner*—Sanjiv Shah
*Attorney, Agent, or Firm*—Oblon, Spivak, McClelland, Maier & Neustadt, P.C.

[57] ABSTRACT

A neural network apparatus includes a neural network including at least two neuron layers each having a plurality of neurons and at least one synapse layer having a plurality of synapses each arranged between the neuron layers, each synapse storing a weight value between the neurons and multiplying the weight value with an output value from each of the neurons in the previous-stage neuron layer to output a product to the next-stage neuron layer, a section for causing an error signal between an output from the neural network and a desired output to back-propagate from an output-side neuron layer to an input-side neuron layer of the neural network, a learning control section for updating the weight value in the synapse on the basis of the error signal and the output value from the previous-stage neuron, and a selecting section for selecting a synapse whose weight value is to be updated by the learning control section when the learning control section is to update the weight values of a predetermined number of synapses in a predetermined order.

18 Claims, 8 Drawing Sheets

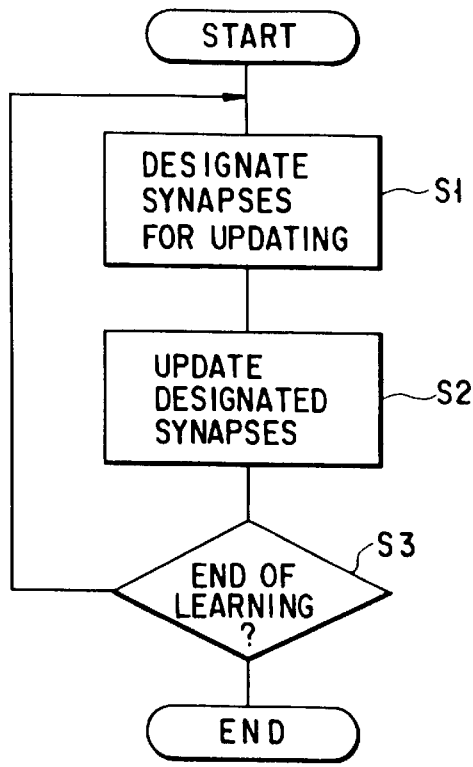
F I G. 5
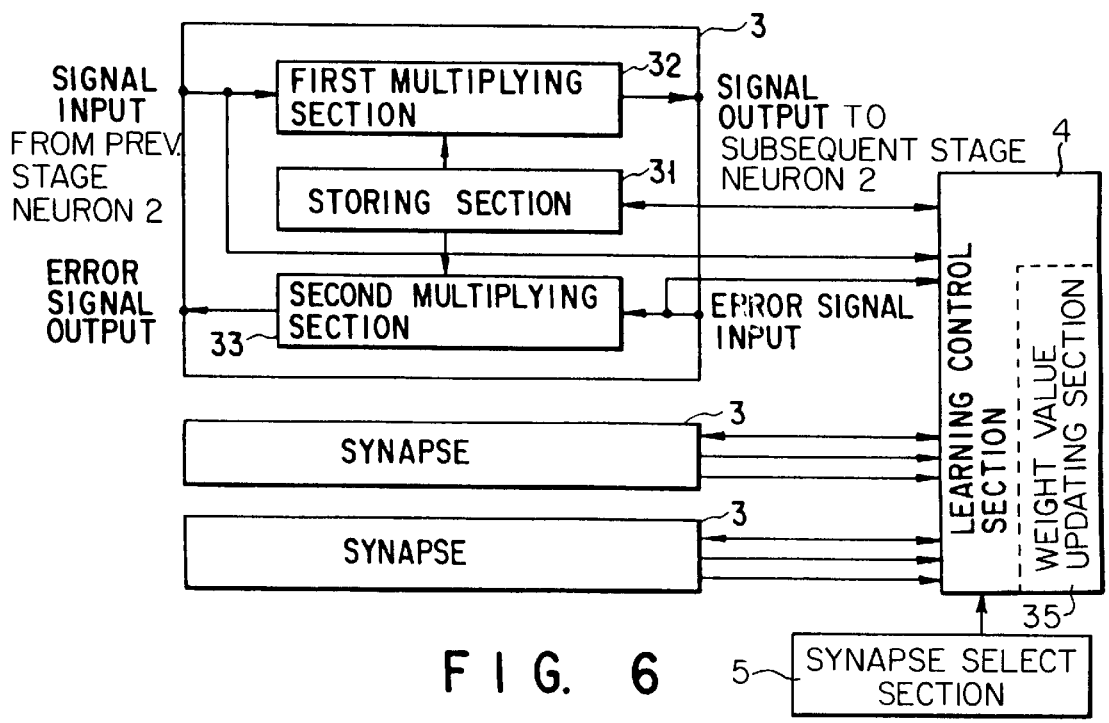
F I G. 6

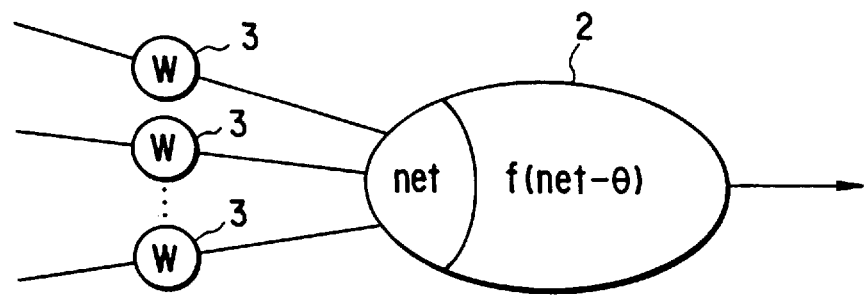
F I G. 9
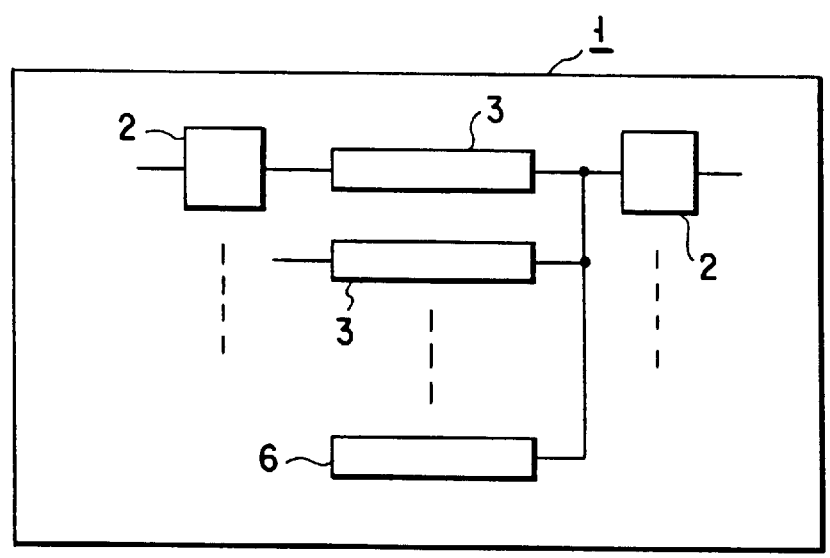
F I G. 10

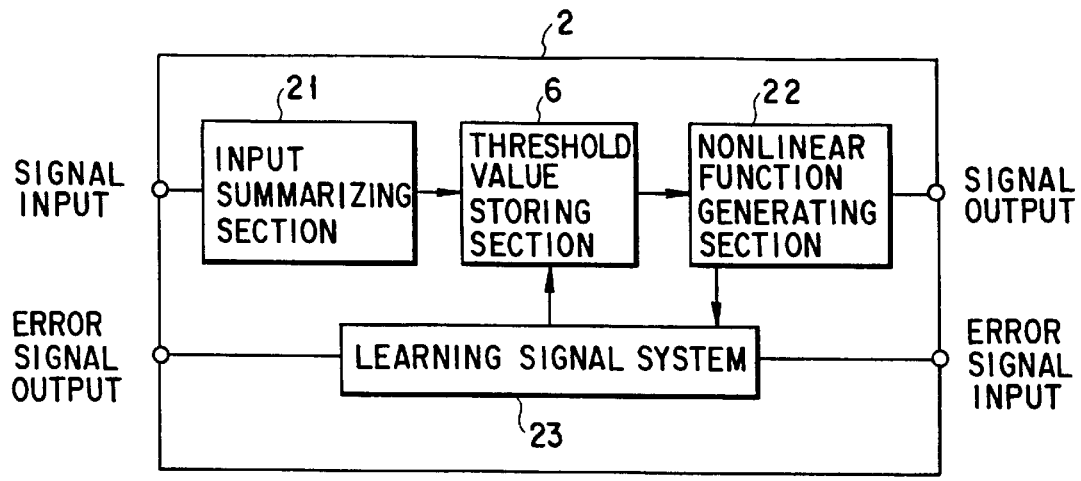
F I G. 13
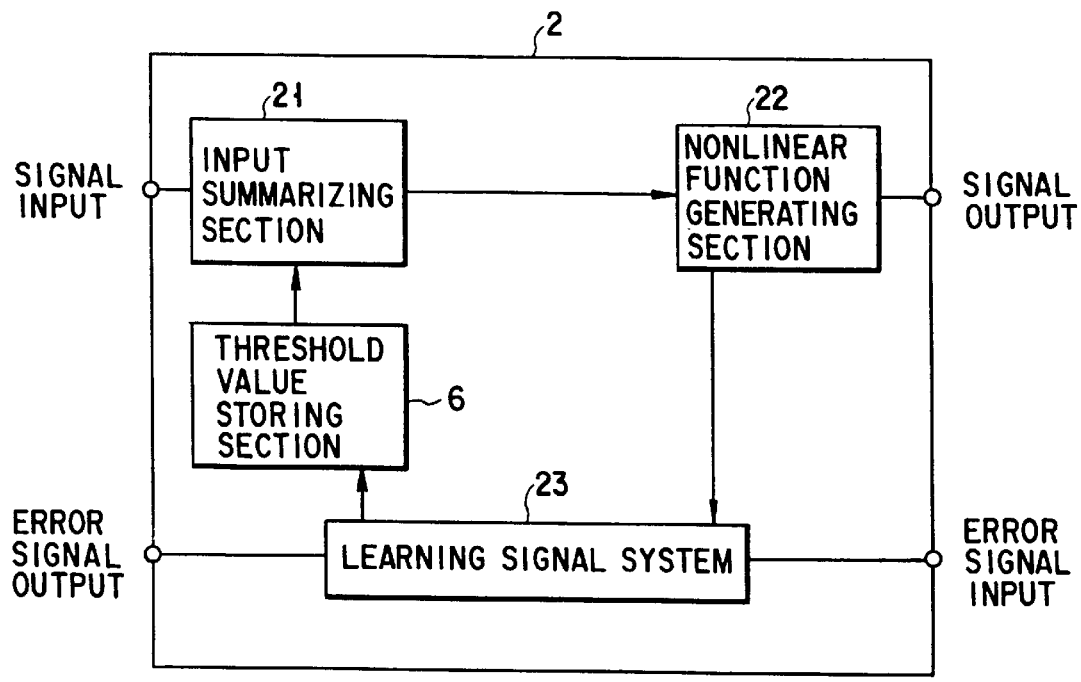
F I G. 14

NEURAL NETWORK APPARATUS AND LEARNING METHOD THEREOF

This application is a continuation of application Ser. No. 08/309,884, filed on Sep. 20, 1994, now abandoned.

BACKGROUND OF THE INVENTION

1. Field of the Invention

The present invention relates to a neural network apparatus and a learning method thereof.

2. Description of the Related Art

With the advance of microelectronics, an LSI capable of performing advanced signal processing at high speed has been realized. Such LSIs have been used for apparatuses in a variety of industrial fields.

In the fields of speech and character recognition and the fields of control for a system the dynamics of which are difficult to describe or a system which mainly depends on human experiences, some conventional sequential processing methods do not have sufficient capacities in practice.

In recent years, the use of signal processing using a neural network for simulating a parallel discrete processing method of a living body to replace (or compensate) the conventional sequential information processing method has been examined. A neural network LSI is desired in view of the apparatus scale and the processing speed. The neural network LSI can be used not only in an existing system but also in a variety of new application fields.

A capacity of the neural network depends on the network scale. For this reason, when a network is to be used in a variety of fields, a large-scale network must be realized on a small LSI chip area. To create a large-scale network on a limited chip size, the number of elements constituting each functional block of the network must be reduced. Reduction in the number of gradation levels of weight values in synapse connections is one method of reducing the number of elements.

In a back propagation method and a learning method realized by improving the back propagation method, however, the number of gradation levels (accuracy) of synapse connections required for learning is larger than the number of gradation levels required for obtaining a desired output after learning due to rounding errors in calculations (J. L. Hoit, J. N. Hwang: "Finite Precision Error Analysis of Neural Network Electronic Hardware Implementation", Proceedings of International Joint Conference on Neural Networks, Seattle, 1, pp. 519–525, IEEE (1991)). Therefore, even if a neural network learns with gradation levels the number of which is sufficient to obtain a desired output, satisfactory output characteristics cannot be obtained.

As described above, in a learning method in a conventional neural network apparatus, the number of gradation levels larger than that required at the end of learning is required during learning. Therefore, a large number of elements are required, and it is difficult to create a large-scale network with a limited hardware amount.

Another method of reducing the number of elements while preventing an increase in complexity of the circuit arrangement is a method of fixing output values from some previous-stage neurons to a predetermined value and using a synapse connection weight value between these neurons and the present stage as a threshold value without adding a new circuit for a neuron threshold value. This method is advantageous in that the synapse connection weight value and the threshold value can be updated to optimal values by learning.

In this method using some previous-stage neurons and the synapse connection weight value to obtain a threshold value, in a case of a hardware having a constraint for a maximum output amplitude, when the range of a summarizing or summation value net of inputs to the neurons is widened due to an increase in network scale, the entire range cannot be covered with the threshold value obtained by a small number of neurons and the synapse connection weight value in the above method, and an optimal value cannot be set. This is one factor which degrades learning convergence. To prevent degradation of such a learning convergence, a large number of neurons must be utilized for setting a threshold value. When a large number of neurons are used to set a threshold value, many neurons integrated on a limited chip area are wasted, and it is, therefore, difficult to realize a large-scale network.

In the conventional neural network apparatus as described above, the outputs from some previous-stage neurons are fixed to a predetermined value, and the synapse connection weight value between these neurons and the present stage is utilized as a threshold value so as to prevent an increase in complexity of the circuit arrangement. When the network size is increased, the learning convergence is degraded. To solve this problem, a large number of neurons are required, and neurons on a limited chip area cannot be effectively utilized. As compared with a network scale having the same number of neurons, the amount of hardware as an entire system increases. As a result, it is difficult to create a large-scale network.

SUMMARY OF THE INVENTION

It is an object of the present invention to provide a neural network apparatus and a learning method thereof.

More specifically, the present invention has been made to achieve the following objects:

(1) to perform effective learning even if a synapse connection weight value has a small number of gradation levels; and (2) to realize a large-scale network having sufficiently high learning convergent performance.

According to the first aspect of the present invention, the amount of change in synapse connection weight value in one learning cycle can be reduced because the weight values of the synapse connections are locally updated by learning. In addition, effective learning can be performed even if the number of gradation levels for the synapse connection weight values is small. According to the first aspect of the present invention, therefore, synapses can be realized by a smaller number of elements, and a large-scale network can be created on a limited chip area.

A neural network apparatus according to the second aspect of the present invention has a feature in that a threshold value storing section is arranged as an independent circuit block.

According to the second aspect of the present invention, the neuron threshold value function is independently realized by a simple circuit arrangement. The neurons and synapses in the neural network apparatus can be utilized without any waste. Several neurons need not be used for setting a threshold value, unlike the conventional neural network. The amount of hardware can be greatly reduced as a whole, and large-scale network hardware can be realized on an LSI having a limited area.

It is more effective to combine the first aspect of the invention and the second aspect thereof.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a flow chart showing the flow of a learning method of the present invention;

FIG. 6 is a block diagram showing the arrangement of the main part of a neural network apparatus according to the first embodiment of the present invention;

FIG. 9 is a view showing a neuron model;

FIG. 10 is a view showing the schematic arrangement of a neural network apparatus according to the second embodiment of the present invention;

FIG. 13 is a block diagram showing an arrangement in which a threshold value storing section is connected to the input of a nonlinear function generating section in a neuron block; and FIG. 14 is a block diagram showing an arrangement in which a threshold value storing section is connected to the input section in a neuron block.

DETAILED DESCRIPTION OF THE PREFERRED EMBODIMENTS

The preferred embodiments of the present invention will be described below with reference to the accompanying drawings.

Neural networks are mainly classified into (1) a network for learning (Feed Forward Type; Perception Model); and (2) a network for solving an optimization problem (Feedback Type; Hopfield Model).

The feed forward type neural network is mainly applied to pattern recognition, while the feedback type neural network is mainly applied to optimization.

Learning is defined as follows in the above neural networks.

Learning in the feed forward type neural network is to update a synapse connection weight value (to be referred to simply a weight value hereinafter) of the neural network so as to absorb any difference between an output signal and an input signal.

Learning in the feedback type neural network is to set a neural network weight value prior to execution of learning and perform learning by correcting a feedback connection. For this reason, in the neural network of this type, the weight value is not basically updated during execution of learning, and calculations are repeated until outputs from neurons converge.

Figure 1A:
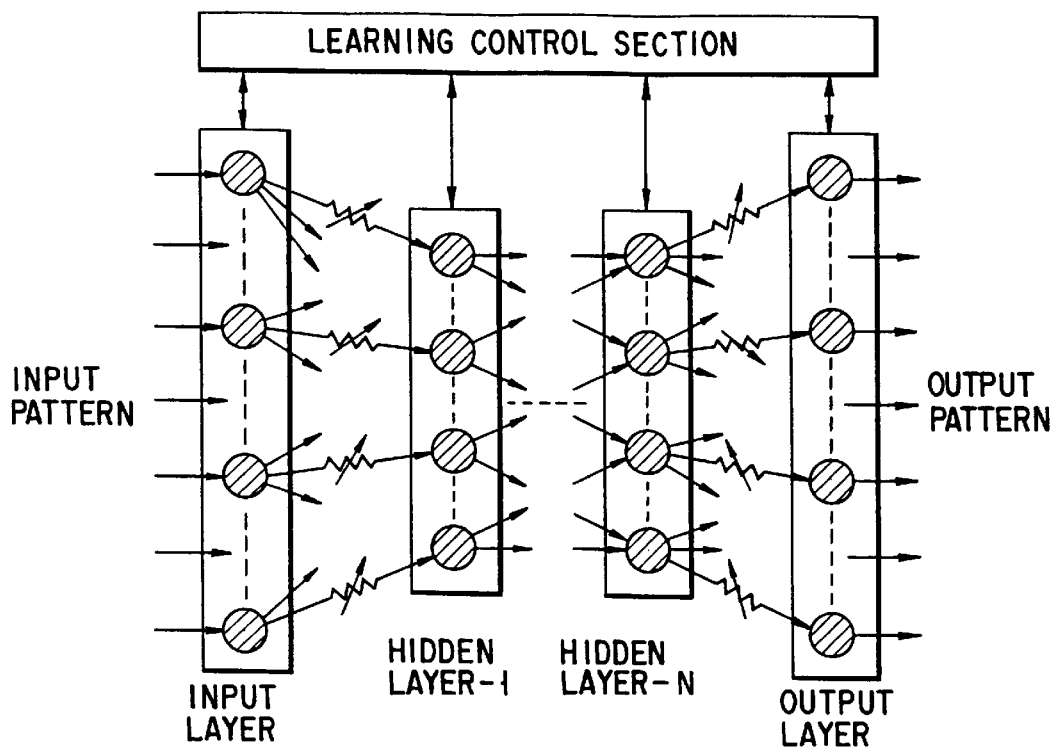
FIGS. 1A and 1B are views showing the schematic arrangements of typical neural networks.
Figure 1B:
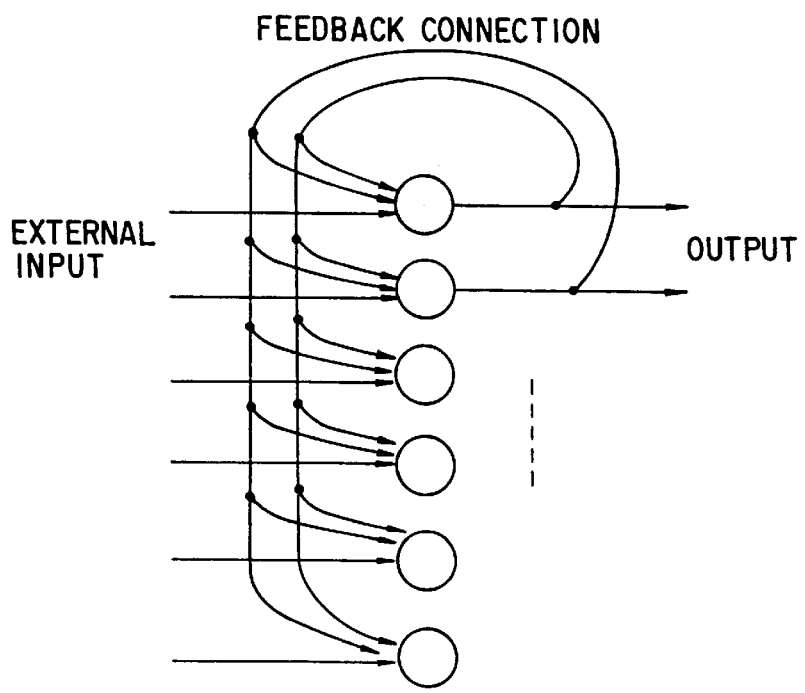

The schematic arrangements of the feed forward and feedback type neural networks are shown in FIGS. 1A and 1B, respectively.

Although the present invention can be applied to either neutral network, the present invention is applied to a feed forward type neural network in the following embodiments, for the descriptive convenience. Note that updating of weight values means correction of feedback connections when the present invention is applied to the feedback type neural network.

In the feed forward type neural network, the weight value can be updated by learning to a value close to a teacher signal as a desired output. If the neural network is implemented by hardware, however, effective learning cannot be performed, unless the number of weight gradation levels is larger than that required in practice.

In a back propagation method or a learning method based on it, learning is, more specifically, finding an optimal weight value in accordance with a steepest descent method which minimizes an energy function represented by the following equation:

$$E = \sum_k (T_k - O_k)^2 \qquad (1)$$

where $T_k$ is the teacher signal externally applied to an output layer neuron k and $O_k$ is the output from the output layer neuron k. Note that the energy function E represents the square sum of differences between the teacher signal and the outputs from all the output layer neurons 2.

Figure 2:
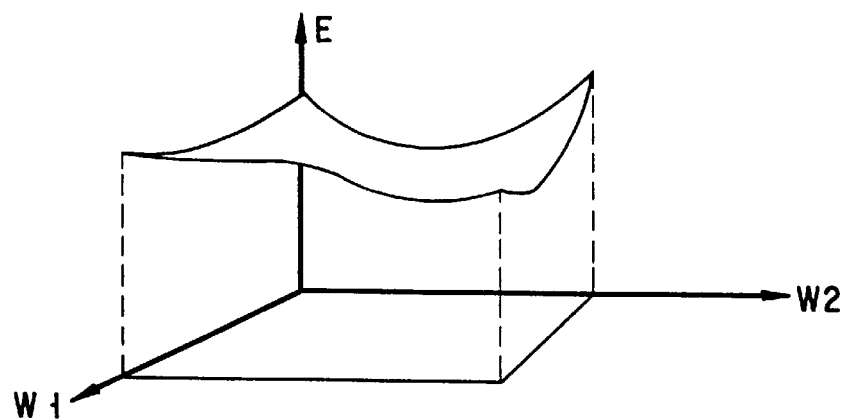
FIG. 2 is a view geometrically representing an energy function.
Figure 3:
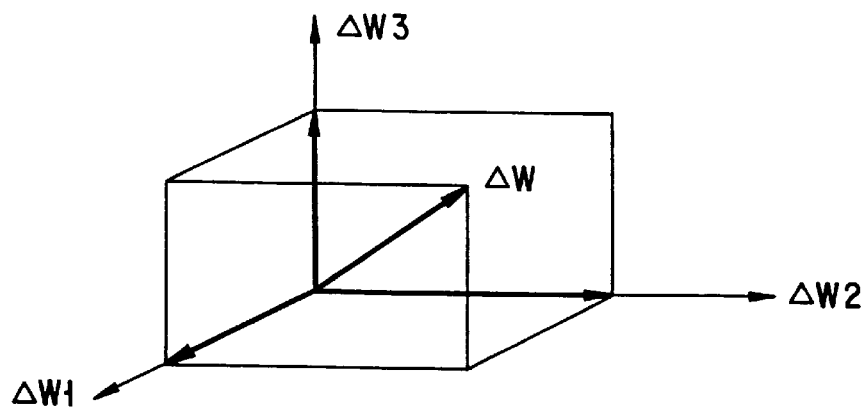
FIG. 3 is a view showing a weight value updating amount vector ΔW for synapse connection.

The energy function can be geometrically expressed, as shown in FIG. 2. For the sake of simple illustration, the energy function E is expressed in a three-dimensional space using two weight variables. In practice, the energy function E has dimensions the number of which is equal to the number of synapse connections. Learning is performed to find a minimum value on the energy plane on the basis of the gradient of a hyper-plane of the energy function in FIG. 2. Each weight value updating amount ΔW is obtained in accordance with the back propagation method as follows:

$$\Delta W_{ij} = \eta \delta_j O_i \qquad (2)$$

where η is the proportionality constant, $\delta_j$ is the error signal back-propagating from a subsequent-stage neuron, and $O_i$ is the output from the previous-stage neuron. Therefore, the weight value updating amount ΔW is expressed as a vector having each weight value updating amount $\Delta W_{ij}$ as a component, as shown in FIG. 3.

Figure 4:
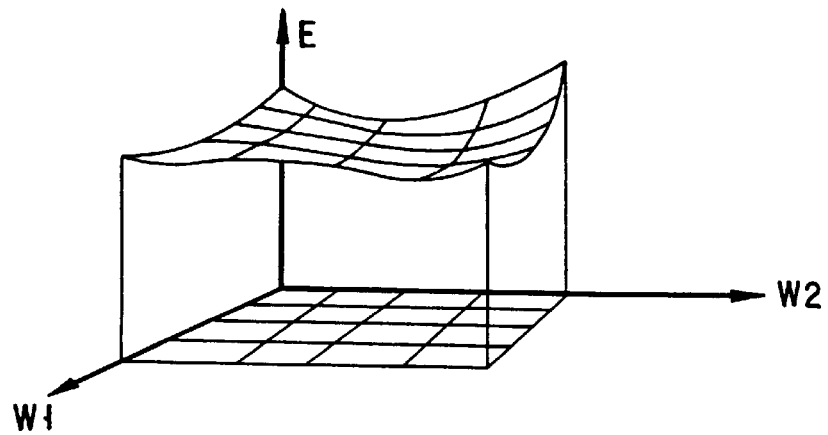
FIG. 4 is a view showing the energy function with finite accuracy.

When a neural network is constituted by hardware, the weight value is expressed as a finite value (accuracy). Weight values are discrete values because the accuracy of the weight values is finite. An energy hyper-plane can be expressed by a net, as shown in FIG. 4. As shown in FIG. 4, since possible weight values are only lattice points in the weight space, possible energy values are only the lattice points of the net. That is, the interval between the lattice points as the net of the energy hyper-plane in FIG. 4 represents the weight resolution.

As described above, accuracy better than the weight accuracy required for outputting a desired output after learning is required upon learning. This indicates that it is very difficult to find a desired solution in a weight space having a large interval between the lattice points (i.e., a space having a low resolution) in accordance with a learning method such as a back propagation method, although a solution is present even in this space.

The weight value is updated based on the gradient of the energy hyper-plane. When a given point is taken as an example, the direction of gradient of the energy hyper-plane at this point is not associated with the weight accuracy. In actual learning, however, effective learning cannot be performed when the number of weight gradation levels is small and the interval between the lattice points is large. For example, even if learning is started with the same initial value, the output converges to a point except for a point representing a desired solution when the weight resolution is low. In particular, learning is always repeated unless learning is determined to have been completed with reference to a determination criterion. When the matrix interval is large, convergence to a specific point near a target solution point is achieved, but the output fluctuates within a wide range. As a result, learning cannot be completed.

Effective learning cannot be attained when the weight value updating amount vector $\Delta W$ is large (i.e., when the number of weight gradation levels is small) due to the above reason.

Each component of the updating amount vector $\Delta W$ cannot have a resolution higher than the weight resolution. For this reason, to reduce a magnitude of the updating amount vector $\Delta W$, the number of dimensions of the updating amount vector may be reduced. That is, the updating amounts for several weight values are set zero. The magnitude of the weight value updating amount vector $\Delta W$ can be obtained as each weight value updating value $\Delta W$:

$$\Delta w = \left( \sum_{i=1}^{n} \Delta w_i^2 \right)^{1/2} \quad (3)$$

Therefore, the number of weight values to be updated in one learning cycle is limited to decrease the magnitude of the weight value updating amount vector $\Delta W$.

Learning is performed in the following sequence of a flow chart in FIG. 5.

In a learning mode, a neural network continues learning until learning is stopped in association with the learning cycle count, error values, and the like.

Synapses for updating weight values in repeated learning are set or designated (step S1). More specifically, the addresses of synapses accessed by a learning control section during updating the weight values are programmed.

When a signal is fed forward to obtain an output, and an error signal back-propagates, weight value updating is performed (step S2). Weight value updating is performed based on the error signals propagating in a direction opposite to the feed forward signal of the synapse. The learning control section accesses the values of the above two signals and the present weight value stored in a memory for each addressed synapse, thereby updating the weight value. That is, all the weight values are not updated, but the weight values of a predetermined proportion of all the synapses are updated.

It is determined whether learning is ended (step S3). If NO in step S3, the flow returns to step S1 to perform learning again. In learning from the second learning cycle, the weight values of synapses except for the synapses whose weight values have been updated in the previous learning cycle are set or designated (step S1). At this time, a synapse whose weight value has been updated may be selected (set) again depending on the proportion of synapses whose weight values are updated in one learning cycle. However, synapses whose weight values are to be updated are equally selected during repeated learning.

This operation is repeated while the neural network is set in the learning mode.

In learning of the neural network, the following two methods are available to cause the neural network to learn a plurality of input/output relationships.

According to the first method, a pattern is presented before a synapse whose weight value is to be updated is set or designated. When learning of this pattern is completed, learning of the next pattern is started. In this case, an input pattern and a teacher pattern are presented prior to step S1.

According to the second method, after a synapse whose weight value is to be updated is set or designated, patterns are presented to perform learning until they are exhausted. When learning of all the patterns is completed, next learning is started. In this case, an input pattern and a teacher pattern are presented after step S1 but before step S2.

It is very difficult to realize the back propagation method on hardware because this method is described assuming infinite accuracy. There is known a method of updating by each LSB (Least Significant Bit) length of a weight value memory on the basis of the sign of back-propagating error information used in the back propagation method. The present invention is effectively applied to the learning method using each LSB length as the weight value updating amount due to the following reason.

Even if weight value updating is performed in units of LSB lengths, the weight value updating amount increases if the network scale and the number of synapses are increased. If $\Delta W$ is defined as $\pm$LSB, the magnitude of $\Delta W$ is always constant. When the weight bit length is increased by one, the magnitude of $\Delta W$ is doubled. When all the synapses are not updated at once, but are divided and the divided groups are sequentially updated, the magnitude of $\Delta W$ is reduced, thereby improving the convergence performance. When the number of synapses to be updated in one learning cycle is set to ¼ the total number of synapses, the magnitude of $\Delta W$ is kept unchanged even if the weight accuracy is degraded by one bit. Therefore, effective learning can be performed even if the prepared weight bit accuracy is not so high.

For example, assume that accuracy required for learning a given problem at a given network size is known, and that this accuracy is higher than accuracy prepared by hardware. In this case, the number of weight values to be updated in one learning cycle is selected to keep the magnitude of $\Delta W$ unchanged.

A number m of weight values to be updated in one learning cycle is set to satisfy the following condition:

$$m = <N \times (¼)^{(B-b)} \quad (4)$$

where N is the total number of the synapses, B is the bit length of a weight value necessary for learning, and b is the bit length of a weight memory prepared in hardware. In practice, if m is almost equal to the value on the right-hand side, effective learning is performed even if the above relation is not established.

Learning using three weight value updating amounts, i.e., 0 and $\pm W$ (W is a predetermined value such as an LSB) is also reported (P. A. Shoemaker, W. J. Carlin and R. L. Shimabukuro: "Back Propagation Learning With Trinary Quantization of Weight Updates", Neural Networks, Vol. 4, pp. 231–241 (1991)). This learning rule requires knowledge for effectively setting a determination criterion because the weight value updating value is determined in correspondence with the error signal. To realize this, a large amount of hardware is required. In addition, all the weight values may be updated in the initial learning period. In learning of a neural network having high dependency on the initial value, a problem of a large ΔW cannot be solved.

The present invention is also effective for a neural network apparatus having a sufficiently high accuracy and a simulator. For example, when the present invention is directly applied to the back propagation method, the weight value updating amount varies because a synapse whose weight value is not updated during learning is present. This has the same effect of preventing a local minimum value as in a conventional method. Although fine settings such as settings of the magnitude of noise to be applied are required in the conventional method, the present invention does not require such fine settings, thereby simplifying the arrangement.

FIG. 6 is a block diagram showing the arrangement of the main part of a neural network apparatus according to the first embodiment of the present invention. The constituent elements in FIG. 6 are constituted on one neural network apparatus (e.g., one chip).

Referring to FIG. 6, each synapse 3 comprises a storing section 31 for storing a weight value, a first multiplying section 32 for outputting a result, obtained by multiplying an output from a previous-stage neuron 2 with a weight value, to a subsequent-stage neuron 2, and a second multiplying section 33 for outputting a result, obtained by causing the subsequent-stage neuron 2 to multiply a back-propagating error signal output with a weight value, to the previous-stage neuron 2.

A learning control section 4 comprises a weight value updating section 35 for updating the synapse connection weight on the basis of an error signal back-propagating from the subsequent-stage neuron 2 and an output from the previous-stage neuron 2, and a synapse selecting section 5 for selecting a synapse whose weight value is to be updated.

As shown in FIG. 6, the present invention can be realized by causing a plurality of synapses 3 to share one learning control section 4. When the number of weight gradation levels is decreased, not only the number of elements is reduced, but also the number of learning control sections 4 each shared by synapses can be reduced. As a result, the total amount of hardware can be greatly reduced.

Figure 7:
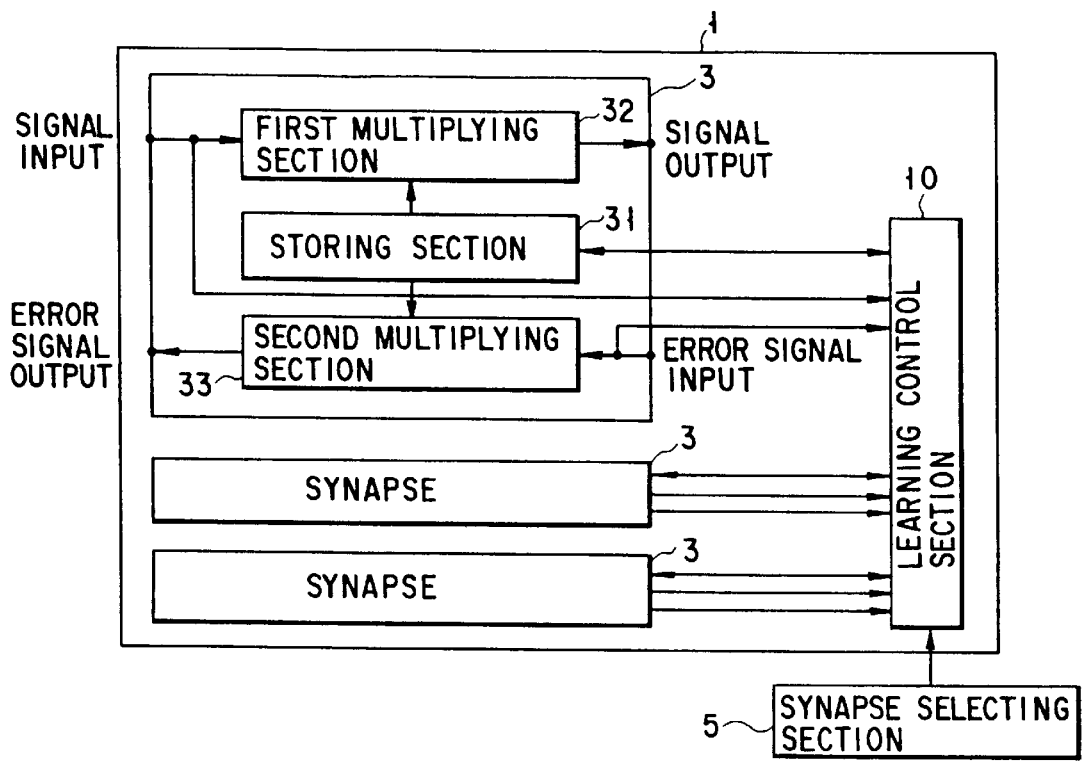
FIG. 7 is a block diagram showing a modification of the first embodiment.

FIG. 7 is a block diagram of an arrangement in which the synapse selecting section 5 included in the learning control section 4 in FIG. 6 is arranged outside the neural network apparatus 1. In this arrangement, not only the number of elements but also the number of learning control sections 10 can be reduced as in the neural network apparatus in FIG. 6. In the present invention, the synapse selection according to the learning state can also be programed.

Figure 8:
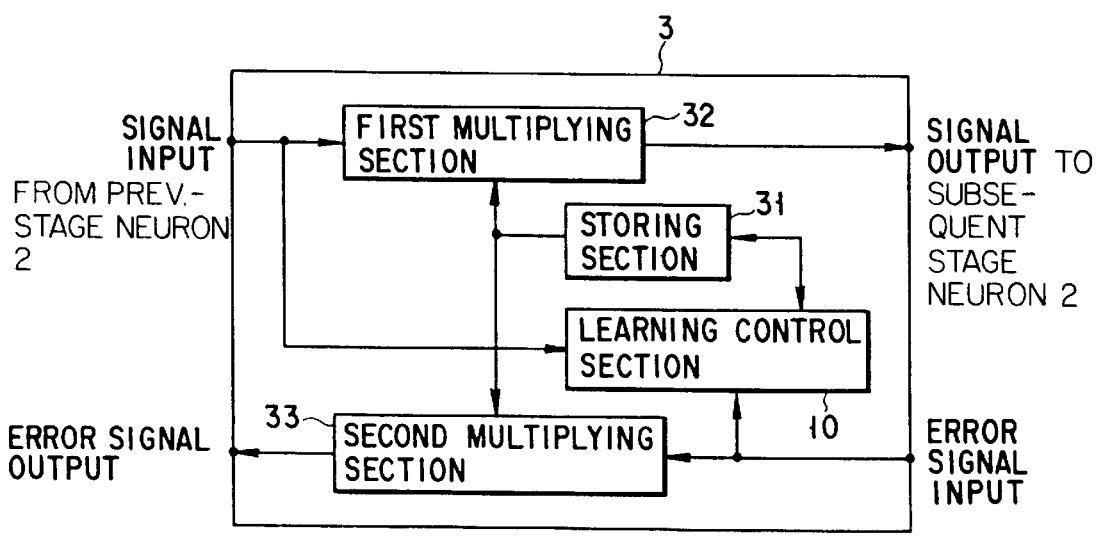
FIG. 8 is a block diagram showing another modification of the first embodiment.

FIG. 8 is a block diagram showing the arrangement of a synapse including a learning control section 10.

Each synapse 3 comprises a storing section 31 for storing a weight value, a first multiplying section 32 for outputting a result, obtained by multiplying an output from a previous-stage neuron 2 with a weight value, to a subsequent-stage neuron 2, and a second multiplying section 33 for outputting a result, obtained by causing the subsequent-stage neuron 2 to multiply a back-propagating error signal output with a weight value, to the previous-stage neuron 2. In addition, each synapse 3 also includes a learning control section 10 for updating the connection weight of the synapse 3 on the basis of the error signal back-propagating from the subsequent-stage neuron 2 and the output from the previous-stage neuron 2.

With the above arrangement, the bit length of a signal line connecting the learning control section 10 and the storing section 31 is set larger than that connecting the storing section 31 and the first and second multiplying sections 32 and 33. Even if the synapses are updated all at once, the weight values in the weight space can be kept unchanged. With this arrangement, an inertia required for learning a plurality of patterns can be provided.

When the first and second multiplying sections 32 and 33 comprise analog multipliers, D/A converters must be arranged between the storing section 3 and the multipliers.

The threshold value of a neuron will be described with reference to FIG. 9 prior to a description of the second embodiment of the present invention.

As represented in a model of FIG. 9, a neuron 2 outputs a nonlinear conversion result of the difference obtained by subtracting a threshold value θ of the neuron 2 from a summation value net. This summation value net is obtained by adding the products obtained by multiplying outputs from a plurality of previous-stage neurons 2 with the weight of the synapse 3. The θ greatly contributes to the input/output relationship in the network as much as the weight value does. Therefore, the θ must be set to an optimal value by learning.

When a neural network is arranged in hardware, it includes a weight multiplying section, a nonlinear arithmetic operation unit, and the learning control section 4 for updating the weight values. The threshold value of the neuron 2 can be set without preparing a new functional block.

The summation sum of the inputs of neurons j is represented by equation (5) below:

$$\text{sum}_j = \sum_{i=0}^{n} W_{ij} O_i \qquad (5)$$

where $W_{ij}$ is the weight value obtained when neurons i and j are connected to each other and $O_i$ is the output from the previous-stage neuron i.

When an output $O_0$ having a predetermined value is given regardless of the input to the previous-stage neuron 2, equation (6) is obtained as follows:

$$\begin{aligned} \text{sum}_j &= \sum_{i=0}^{n} W_{ij} O_i - W_{0j} O_0 \\ &= \text{net}_j - \theta_j \end{aligned} \qquad (6)$$

The first and second terms of the right-hand side of equation (6) are regarded as the summation $\text{net}_j$ of the inputs to the neurons j and the threshold value $\theta_j$, respectively.

If one or some of hidden layer neurons are set to have outputs having a predetermined value except for zero for an output layer neuron having the above arrangement, and one or some of input neurons are set to have outputs having a predetermined value except for zero for a hidden layer neuron, weight values between the output layer neuron and the hidden layer neuron and between the hidden layer neuron and the input layer neuron serve as threshold values. These threshold values are updated by learning together with other weight values.

In a conventional method, the threshold value has a predetermined range of values because the output amplitude of one synapse 3 is predetermined. When the summation of outputs from a plurality of synapses 3 is calculated, the range of input values of a given neuron is widened, and the threshold value set in one synapse 3 cannot cover the above range and cannot have an appropriate value. For this reason, the neuron output tends to fall within the saturation region of nonlinear function, and the neuron output cannot be changed although the weight is updated. Y. Lee, S. H. Oh, M. W. Kim: "An analysis of Premature Saturation in Back Propagation Learning", Neural Networks, Vol. 6, pp. 719–728 (1993) pointed out that such a neuron output saturated state results one of in degradation of learning convergence such as a local minimum value.

This saturation phenomenon becomes conspicuous when the network scale is increased. To avoid degradation of learning convergence, a plurality of neurons having a predetermined output must be arranged to set a threshold value. The number of neurons having a predetermined output must be increased in proportion to the increase in network scale. Although threshold values are set to avoid an increase in complexity of the circuit network and an increase in hardware amount in the conventional neuron, this wastes a large number of neurons. The amount of hardware is also increased in the system as a whole. It is, therefore, difficult to create a large-scale network on a limited chip area.

If a threshold value storing section which can cope with a network scale expansion with a simple circuit arrangement is realized, the hardware amount is greatly reduced in the system as a whole, thereby facilitating construction of a large-scale network.

The second embodiment of the present invention is characterized in that an independent threshold value storing section is arranged in a neural network apparatus.

FIG. 10 is a block diagram showing the schematic arrangement of a neural network apparatus according to the second embodiment of the present invention.

A neural network apparatus 1 comprises a plurality of synapses 3 and a threshold value storing section 6. Referring to FIG. 10, a subsequent-stage neuron 2 receives a summation result obtained by multiplying an output value from each previous-stage neuron 2 with the corresponding weight value. The subsequent-stage neuron 2 also receives an output from the threshold value storing section 6. The threshold value from the threshold value storing section 6 is a value for sufficiently compensating for the $\Delta W$ and is updated based on a back-propagating signal input (error signal) (not shown). The weight value of the synapse 3 is updated based on a signal input (error signal) having a direction opposite to that of the signal input.

Figure 11:
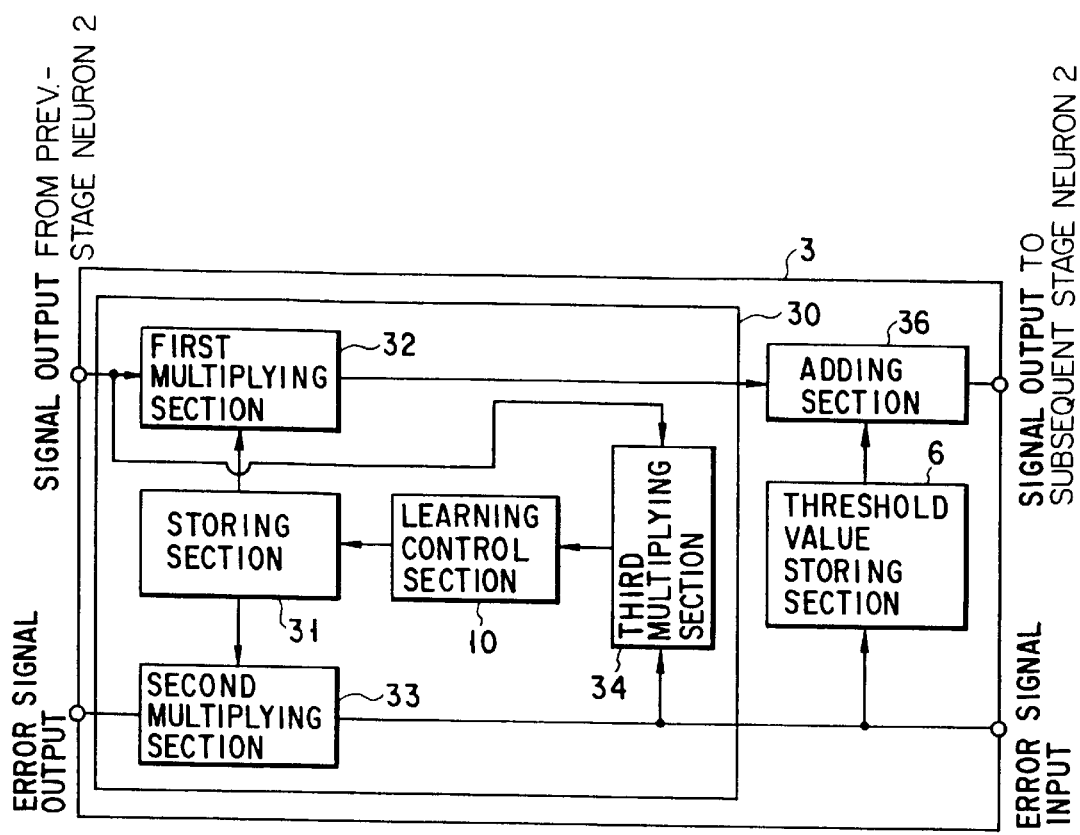
FIG. 11 is a block diagram showing an arrangement in which a threshold value storing section is incorporated in each synapse.
Figure 12:
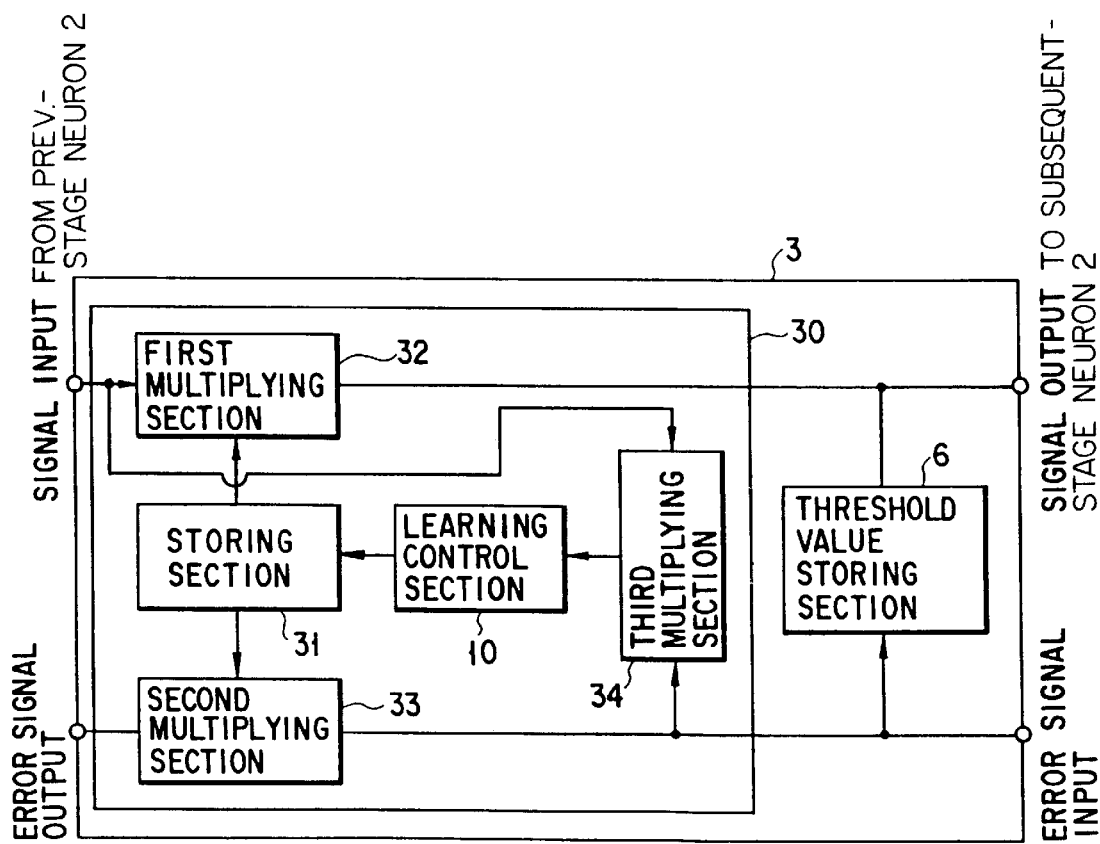
FIG. 12 is a block diagram showing another arrangement in which a threshold value storing section is incorporated in each synapse.

FIGS. 11 and 12 are arrangements in which threshold value storing sections are incorporated in the corresponding synapses.

Referring to each of FIGS. 11 and 12, a synapse core 30 comprises a conventional synapse. The synapse core 30 comprises a storing section 31 for storing a weight value, a first multiplying section 32 for outputting a result, obtained by multiplying an output from a previous-stage neuron 2 with a weight value, to a subsequent-stage neuron 2, a second multiplying section 33 for outputting a result, obtained by causing the subsequent-stage neuron 2 to multiply a back-propagating error signal output with a weight value, to the previous-stage neuron 2, a weight value updating section 35 for updating the weight value stored in the storing section 31 in accordance with progress of learning, and a third multiplying section 34 for multiplying an output from the previous-stage neuron 2 with the backward propagation signal from the subsequent-stage neuron 2.

Referring to FIG. 11, in addition to the synapse core 30, the synapse 3 comprises a threshold value storing section 6 and an adding section 36. The threshold value storing section 6 outputs a threshold value to the adding section 36. The adding section 36 adds a feed forward signal output from the synapse core 30 and the threshold value and transmits the sum to the next-stage neuron 2. Each threshold value is updated based on the input back-propagating signal.

FIG. 12 is a block diagram showing an arrangement in which the synapse 3 outputs a current so as to facilitate summation of inputs to the next-stage neuron 2. In this case, the threshold value storing section 6 is constituted by a variable current source. The adding section 36 shown in FIG. 11 need not be used because the output from the synapse 3 is a current. In the arrangement of FIG. 12, when the output amplitude of the threshold value storing section 6 serving as a current source matches the output amplitude of the synapse core 30, the range of the weight summation of outputs from the previous-stage neurons 2 at each synapse 3 can be set equal to the range of the threshold values.

In addition, when the threshold value in each synapse 3 is limited to a binary value of $\pm I_T$, the arrangement of the threshold value storing section 6 can be simplified. For example, a learning control section (not shown) in the threshold value storing section 6 can be realized by a comparator, a 1-bit memory, and a switch. If this memory comprises a device such as an SRAM, the threshold value can be stably maintained during energization. If the memory comprises a nonvolatile memory such as an EEPROM, the learned threshold value can be retained even if the apparatus is powered off. If each synapse 3 has a threshold value, notwithstanding a binary threshold value, multigradation expressions can be performed because a plurality of synapses 3 are present. As described above, in a case that the synapse includes the threshold value, the change of the threshold value is suppressed by a procedure for selecting the updating synapse during learning.

A reduction in hardware amount in the arrangement of the present invention will be described below.

When the threshold value is a binary value, the threshold value storing section 6 (FIG. 12) including the learning control function can be realized by 20 transistors. This number of transistors is equal to that of the first to third multiplying sections 32 to 34 arranged in each synapse core 30. For example, when a network having 100 neurons is taken into consideration, almost 100 threshold value neurons must be prepared. According to the present invention, an increase in the number of transistors incorporated in the synapse 3 is about 2,000. However, when 100 threshold value neurons are prepared, an increase in the number of transistors for only the multiplying sections of the synapse 3 is about 6,000. In practice, the hardware amount is greatly increased if the number of transistors for the learning control and the neuron of each synapse 3 is also considered.

When the threshold value storing section (i.e., the threshold value block in the circuit) is incorporated in the synapse 3, as described above, the hardware amount of each synapse 3 increases. However, this increase is smaller than the number of elements of the synapse core 30. In the system as a whole, the threshold value can be set without using a plurality of synapse cores 30 proportional to the network scale, and the hardware amount can be reduced, as described above. The present invention is very effective to arrange large-scale neural network hardware on a limited chip area.

FIGS. 11 and 12 show the arrangements in which the threshold value storing sections are incorporated in the synapses, respectively. FIGS. 13 and 14 show arrangements in which threshold value storing sections are incorporated in neurons, respectively.

In FIG. 13, a threshold value storing section 6 is connected to the input of a nonlinear function generating section 22.

A neuron 2 comprises an input summarizing section 21 for obtaining a sum of products obtained by multiplying outputs from the previous-stage neurons 2 with a weight value, and the nonlinear function generating means 22 for nonlinearly processing the sum. In addition, the neuron 2 also comprises the threshold value storing section 6 for storing a threshold value and a learning signal system 23 for updating the threshold value in the threshold value storing section 6 as learning progresses.

When the nonlinear function generating section 22 receives a voltage, the threshold value can be expressed as its voltage offset. For example, a level shift circuit is used as the threshold value storing section 6 to generate a threshold value to solve the problem of an offset of the input voltage to the nonlinear function generating section 22. In a differential input circuit is used as the nonlinear function generating section 22, the same effect can be obtained even if the threshold value level shift circuit is connected to any one of the inputs of the differential input circuit.

FIG. 14 shows an arrangement in which a threshold value storing section 6 is arranged so as to input a threshold value to an input summarizing section 21. Referring to FIG. 14, when a neuron 2 receives a current, the input summarizing section 21 can be omitted as in the arrangement of FIG. 12.

The arrangement of each of FIGS. 13 and 14 is substantially the same as that of each of FIGS. 11 and 12 except that the threshold value is incorporated in neurons 2 in place of the synapse 3. The hardware amount can be greatly reduced as compared with a conventional case. The arrangement is very effective to realize a large-scale network.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A neural network apparatus comprising:

a neural network including at least two neuron layers each having a plurality of neurons and at least one synapse layer having a plurality of synapses each arranged between said neuron layers, each synapse storing a weight value between the neurons and multiplying the weight value with an output value from each of the neurons in a previous-stage neuron layer to output a product to a next-stage neuron layer;

means for causing an error signal between an output from said neural network and a desired output to back-propagate from an output-side neuron layer to an input-side neuron layer of said neural network;

learning control means for updating the weight value in said synapse on the basis of the error signal and the output value from said previous-stage neuron; and selecting means for selecting a synapse whose weight value is to be updated by said learning control means when said learning control means is to update the weight values of a predetermined number of the plurality of synapses in a predetermined order, wherein the predetermined number of the plurality of synapses updated per learning cycle is limited to n to reduce a magnitude of an updating amount weight vector, $\Delta W$ given by:

$$\Delta W = \left( \sum_{i=1}^{n} \Delta W_i^2 \right)^{1/2},$$

where $\Delta W_i$ is non-zero weight updating amount by which the weights of the plurality of synapses can be updated and n is less than a total number of the plurality of synapses.

2. An apparatus according to claim 1, wherein said selecting means includes means for updating, based on the number of learning cycles, the number of the plurality of synapses whose weight values are to be updated.

3. An apparatus according to claim 1, wherein said selecting means includes means for randomly designating synapses whose weight values are to be updated.

4. An apparatus according to claim 1, wherein said learning control means includes means for calculating a weight value updating amount having a shorter bit length than that prepared for causing said synapse to store the weight value.

5. A neural network apparatus according to claim 1, wherein the predetermined number of the plurality of synapses updated per learning cycle is one-fourth of the total number of the plurality of synapses.

6. A neural network apparatus according to claim 1, wherein the predetermined number of the plurality of synapses updated per learning cycle is m, where $$m = <N \times (1/4)^{(B-b)},$$

where N is the total number of said synapses, B is the bit length of a weight value necessary for learning, and b is the bit length of a weight memory provided in hardware.

7. A neural network apparatus according to claim 1, further comprising a weight memory for storing weights with a weight accuracy, wherein $\Delta W$ provides a greater accuracy for finding a solution in a solution space than is available using said weight accuracy for all of the plurality of synapses.

8. A neural network apparatus comprising:

a neural network including at least two neuron layers each having a plurality of neurons and at least one synapse layer having a plurality of synapses each arranged between said neuron layers, each synapse storing a weight value between the neurons and multiplying the weight value with an output value from each of the neurons in a previous-stage neuron layer to output a product to a next-stage neuron layer;

means for causing an error signal between an output from said neural network and a desired output to back-propagate from an output-side neuron layer to an input-side neuron layer of said neural network;

learning control means for updating the weight value in said synapse on the basis of the error signal and the output value from said previous-stage neuron; and input means for inputting a control signal for selecting a synapse whose weight value is to be updated by said learning control means when said learning control means is to update the weight values of a predetermined number of the plurality of synapses in a predetermined order, wherein the predetermined number of the plurality of synapses updated per learning cycle is limited to n to reduce a magnitude of an updating amount weight vector, $\Delta W$, given by:

$$\Delta W = \left( \sum_{i=1}^{n} \Delta W_i^2 \right)^{1/2},$$

where $\Delta W_i$ is non-zero weight updating amount by which the weights of the plurality of synapses can be updated and n is less than a total number of the plurality of synapses.

9. An apparatus according to claim 8, wherein said input means includes means for inputting a control signal for updating, based on the number of learning cycles, the number of the plurality of synapses whose weight values are updated.

10. An apparatus according to claim 8, wherein said input means includes means for inputting a control signal for randomly designating synapses whose weight values are to be updated.

11. An apparatus according to claim 8, wherein said learning control means includes means for calculating a weight value updating amount having a shorter bit length than that prepared for causing said synapse to store the weight value.

12. A neural network apparatus according to claim 8, wherein the predetermined number of said synapses updated per learning cycle is m, where $$m = <N \times (1/4)^{(B-b)}.$$

where N is the total number of said synapses, B is the bit length of a weight value necessary for learning, and b is the bit length of a weight memory provided in hardware.

13. A neural network apparatus according to claim 8, further comprising a weight memory for storing weights with a weight accuracy,
   wherein $\Delta W$ provides a greater accuracy for finding a solution in a solution space than is available using said weight accuracy for all of the plurality of synapses.

14. A neural network apparatus according to claim 8, wherein the predetermined number of the plurality of synapses updated per learning cycle is one-fourth of the total number of the plurality of synapses.

15. A learning method of a neural network apparatus, for updating weight values of a plurality of synapses on the basis of an error signal proportional to a difference between a desired output propagating from an output-layer neuron to an input-layer neuron and an actual output of a network so as to set an output from said neural network close to the desired output, the method comprising:
   selecting, based on repeated learning, a subset of the plurality of synapses whose weight values are to be updated in a learning cycle, wherein the number of synapses in the subset is limited to n to reduce a magnitude of an updating amount weight vector, $\Delta W$, given by:

$$\Delta W = \left( \sum_{i=1}^{n} \Delta W_i^2 \right)^{1/2},$$

where $\Delta W_i$ is non-zero weight updating amount by which the weights of the plurality of synapses can be updated and n is less than a total number of the plurality of synapses; and
   updating in the learning cycle only the weight values of the subset of the plurality of synapses selected in the selecting step.

16. A method according to claim 15, wherein the first step includes the step of updating the number of the plurality of synapses to be selected in accordance with the number of repeated learning cycles.

17. A method according to claim 15, wherein the first step includes the step of randomly designating the synapses.

18. A method according to claim 15, further comprising the step of prestoring the weight of the synapse in a predetermined bit length, and wherein
   the second step includes the step of updating the weight value in a bit length shorter than the predetermined bit length.

* * * * *